(12) United States Patent
Fishkin et al.

(10) Patent No.: US 7,404,101 B2
(45) Date of Patent: Jul. 22, 2008

(54) OPTIMAL CONFIGURATION METHOD

(75) Inventors: Stacy G. Fishkin, Mahwah, NJ (US);
Gopal N. Kumar, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 909 days.

(21) Appl. No.: 10/701,276

(22) Filed: Nov. 4, 2003

(65) Prior Publication Data
US 2005/0096884 A1    May 5, 2005

(51) Int. Cl.
*G06F 11/00* (2006.01)
(52) U.S. Cl. .......................................... 714/4
(58) Field of Classification Search ...................... 714/4
See application file for complete search history.

(56) References Cited

U.S. PATENT DOCUMENTS

| | | | |
|---|---|---|---|
| 5,787,271 A * | 7/1998 | Box et al. ...................... 714/4 |
| 6,574,669 B1 * | 6/2003 | Weaver ........................ 709/239 |
| 6,631,128 B1 * | 10/2003 | Lemieux ...................... 370/351 |
| 2005/0060391 A1 * | 3/2005 | Kaminsky et al. ........... 709/220 |
| 2007/0064715 A1 * | 3/2007 | Lloyd et al. .................. 370/401 |

* cited by examiner

*Primary Examiner*—Michael C Maskulinski

(57) ABSTRACT

A method for determining an optimal configuration and redundancy allocation for a system containing a plurality of units grouped into a plurality of elements and one or more modules. The method conducts random statistical sampling of a combinatorial space reflecting the possible combinations, redundancies and integrations of the units and elements in a given system. For each sample combination, the method calculates an optimization metric that reflects the reliability and/or the cost of that combination. The optimization metric may incorporate relative weighting of constraints used to evaluate whether the combination is optimal. The optimum configuration will be the configuration having the lowest optimization metric out of all the samples.

8 Claims, 2 Drawing Sheets

OPTIMAL CONFIGURATION METHOD

BACKGROUND OF THE INVENTION

1. Field of the Invention

The present invention relates to product manufacturing.

2. Description of the Related Art

Many manufactured systems, such as computers, incorporate redundant devices into their designs to ensure that the system continues to function even after a device failure. Before failure of any given device occurs, however, the redundant devices are inactive and therefore tend to increase the overall cost of the product along with increasing reliability. Further, different devices have different failure rates, which should be taken into account when selecting which devices to duplicate for redundancy purposes. More particularly, devices having higher failure probabilities are usually made redundant as a matter of course, while devices having lower failure probabilities may or may not be made redundant, depending on the desired system design.

Because greater redundancy leads to higher system costs, a system designer normally tries to balance reliability with costs. Other manufacturing parameters, such as complexity, may also influence the number of redundant units. Systems to be used in applications where reliable operation is critical may consider cost reduction a lower priority and incorporate more redundant units, even for units having lower failure probabilities. The result is a system that may have a higher cost along with its higher reliability. Conversely, systems where low cost is a higher priority than maximum reliability may have fewer redundant devices, which may also reduce the product's reliability.

Further, for devices that are too expensive to make redundant, it is possible to provide redundancy by combining other types of devices that together carry out the same function as the original, more expensive device to improve reliability and keep the system under control. It is also desirable to integrate multiple functionalities into, for example, a single board in the system. Greater integration may increase the cost overhead for the system, but the overall board cost may be less than the sum of the costs of the individual devices. Integration may also necessitate replacement of an entire board if one functionality fails, but the failure probability of the individual devices on the board should be considered to determine the likelihood of this occurrence. Failure probability is normally a factor that determines the composition of the board itself (e.g., which components will be integrated together on a single board).

Capacity is yet another factor to be considered in a system design. The device configuration should adequately meet expected target capacity demands. This places limits on the number and/or configuration of the units incorporated into the system. Thus, given these and other dimensions, maximizing reliability given cost and/or capacity constraints is a complicated task. Other dimensions, such as integration, redundancy of a more expensive device using a combination of less expensive devices, different priorities for reliability and cost, system capacity, etc. make determining an optimum configuration even more complex because there are so many possible combinations and factors to weigh against each other. Determining an optimum configuration and redundancy allocation for a given system design can take many months through trial and error. Further, because trial and error processes necessarily introduce human error, it is difficult to ensure that the configuration obtained by such processes is truly optimized or even quasi-optimized.

There is a desire for a faster, more reliable way to determine an optimal configuration in a system design.

SUMMARY OF THE INVENTION

The present invention is directed to a method for determining an optimal device configuration for a system containing a plurality of devices. The devices can be a plurality of units grouped into a plurality of elements and/or one or more modules. The invention determines the optimum configuration, which may incorporate redundancies and integrations of devices, to minimize cost while maintaining system reliability at an acceptable level.

In one embodiment, the method conducts statistical sampling of a combinatorial space reflecting the possible combinations, redundancies and integrations of the devices in a given system. For each sample combination, the method calculates an optimization metric that reflects the reliability and/or the cost of that combination. The optimization metric may incorporate relative weighting of constraints used to evaluate whether the combination is optimal.

The sampling and optimization metric calculation may be repeated in an iterative process. Each successive optimization metric may be compared with a previously visited lowest value for this metric. The lowest calculated optimization metric may then be saved along with its associated configuration. The configuration having the lowest optimization metric after the iterative process may be deemed to be close to the optimal configuration.

As a result, the invention may select an approximate optimum configuration or quasi-optimal configuration for given set of constraints without requiring a time-consuming, less reliable human trial and error approach. Note that the inventive method is broad enough to be applied to any area of technology and can be used to optimize any multi-component system to be designed within multi-dimensional constraints.

DETAILED DESCRIPTION

Figure 1:
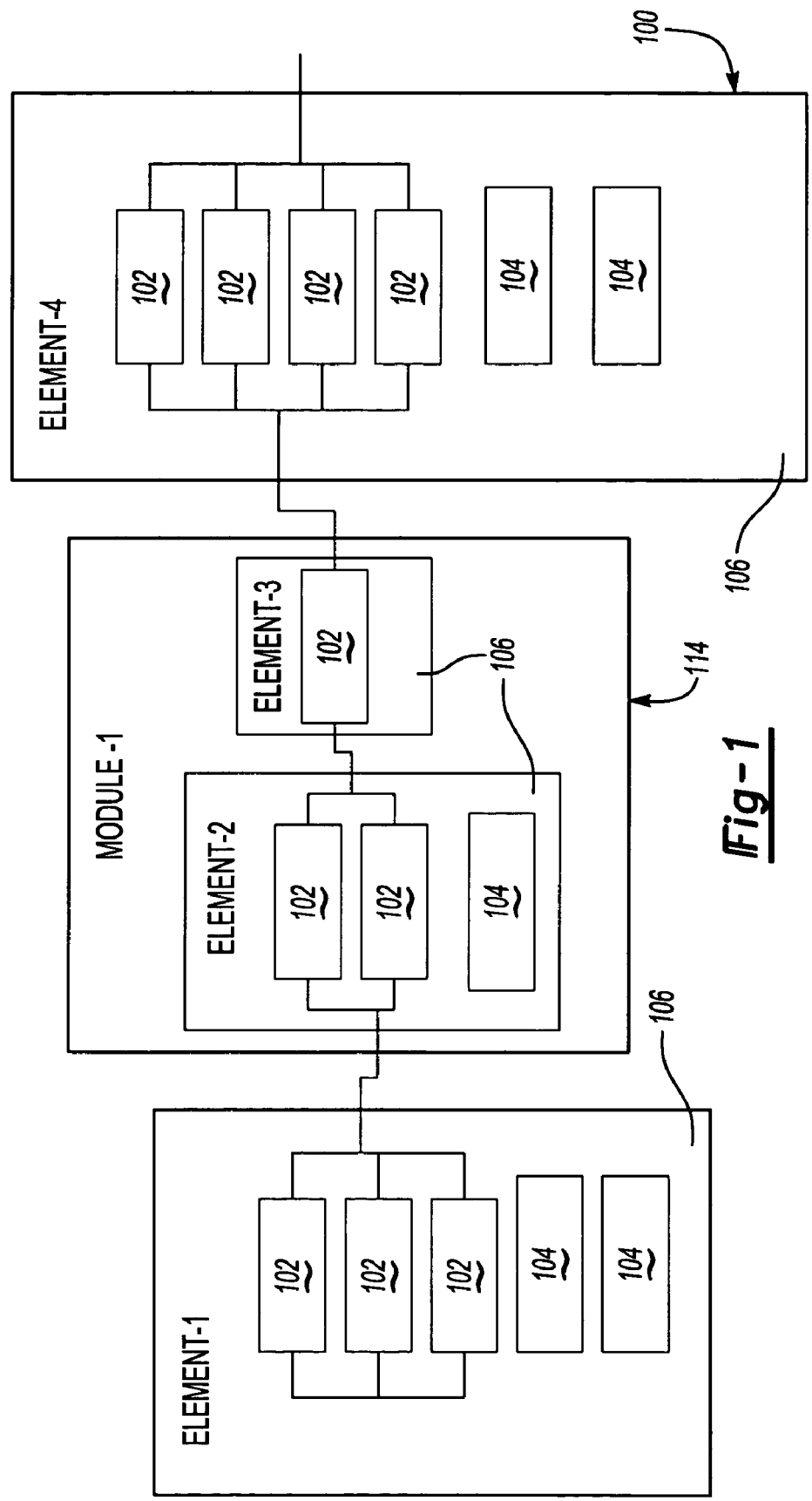
FIG. 1 is a representative diagram of a system having redundant and integrated units.

FIG. 1 is a representative diagram, for illustrative purposes only, of a system 100 having a plurality of primary units 102 and redundant units 104. As shown in the Figure, the primary units 102 and redundant units 104 can be combined into one or more elements 106. Note that some elements 110 may contain only one unit 102. Further, a given element may include only one or more primary units 102 and not contain any redundant units 104. Two or more elements 106 may also be integrated together to form a module 114. The number of different permutations of primary units 102, redundant units 104, and integrations into modules 114 even for systems 100 having relatively few total units makes system optimization for a given cost and reliability target a complex process. For purposes of explanation, the units 102, 104 and elements 106 are generically called "devices" where appropriate.

To streamline optimization, one embodiment of the invention obtains data about each device, such as each element 106, in the system 100 and inputs this information into an optimization tool. The optimization tool then obtains a representative statistical sample of all possible combinations of elements 106 incorporating the primary units 102 as well as possible redundancy and integration configurations and searches the possible combinatorial structures to locate the configuration that best matches selected constraints (e.g., cost, reliability, capacity, target availability of the units, etc.). In other words, the optimization tool solves a combinatorial optimization problem that determines which configuration achieves the constraints. The statistical sampling itself can be conducted via any known method.

Figure 2:
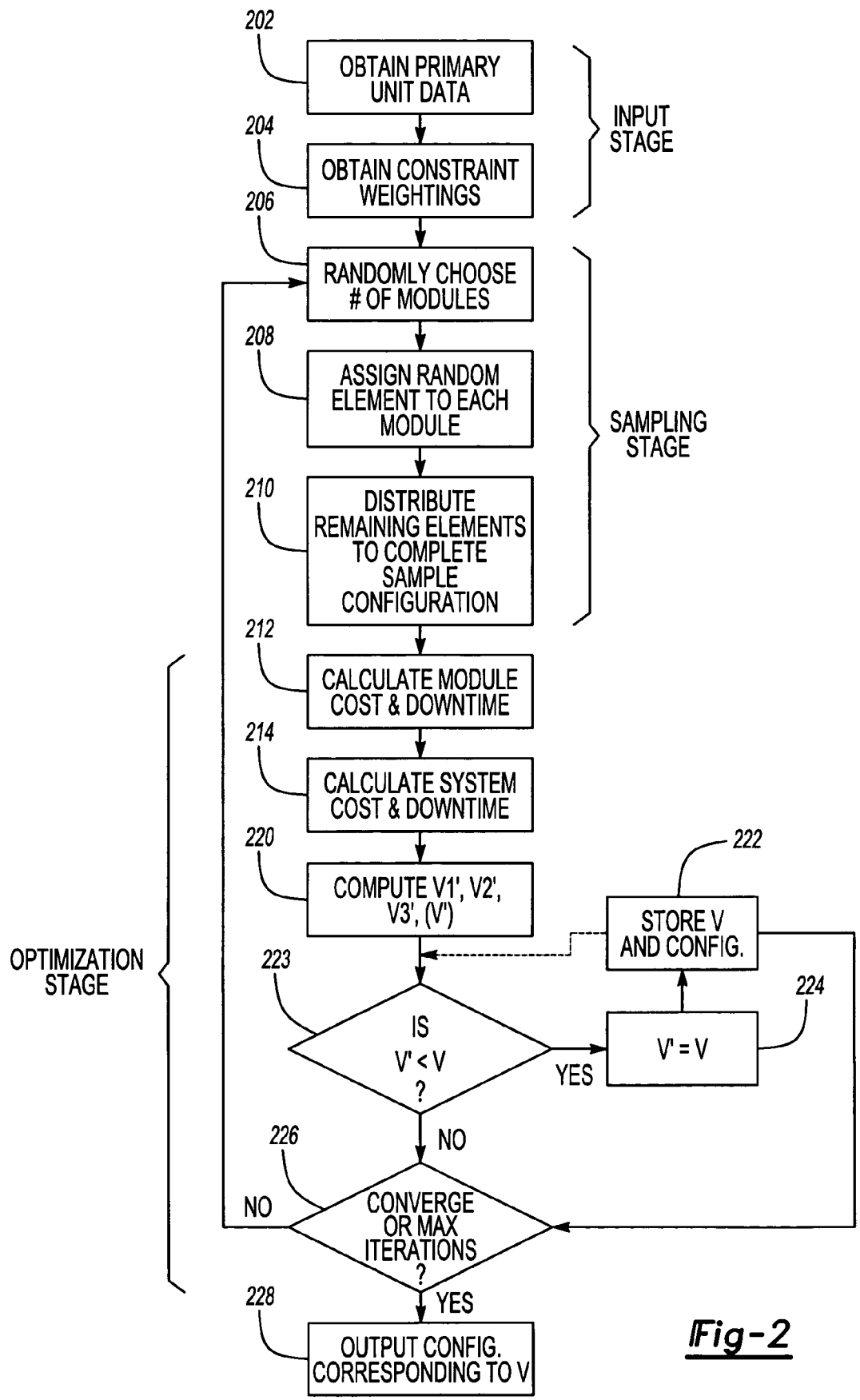
FIG. 2 is a flow diagram illustrating an optimization process according to one embodiment of the invention.

FIG. 2 is a flow diagram illustrating an optimization method and tool 200 according to one embodiment of the invention. The method can be implemented as an optimization tool via any known manner, such as a software algorithm.

As shown in FIG. 2, the tool 200 first obtains data on each element 106 that may be used in the system 100 (block 202). The data itself can include, for example, price, failure rate, functional characteristics, integration characteristics, size, and any other information that may affect the design of the system. For example, cost and reliability are usually considerations in a system design, so the element 106 price and failure rate are usually input into the optimization tool. Note that the addition of redundant units 104 to the primary units 102 can decrease the failure rate of the element 106 and may be taken into account.

As further shown in FIG. 2, the tool may also obtain weightings for each constraint (block 204). This allows a system designer to assign a higher priority to one or more constraints, which may affect the optimal configuration of the system. For example, if the designer wants a system with the highest possible reliability, regardless of the cost or capacity, then the tool will tend to choose allocations that include a greater number of redundant units because cost may be no object compared with reliability. If, on the other hand, cost may be the most important constraint and if the application in which the system will be used does not require perfect reliability, the cost constraint may be given a higher weighting by the designer, causing the tool to disregard combinations having excess redundant units that increase the cost and provide more reliability than may be desired for that system. This weighting step provides the designer with the flexibility to fine-tune the priorities of each constraint to ensure that the tool selects a configuration meeting those specific priorities.

In one embodiment, each constraint (e.g., cost, reliability, capacity, etc.) is assigned a numerical value in a selected scale (e.g., between 0 and 10, with 10 corresponding to the highest priority level) to generate a weighted metric for each constraint. Other metrics, such as cost reduction for modularization (e.g., where the cost of a module 114 may be less than the sum of the costs of the units 102, 104 in that module), compression cost (e.g., the overhead costs for integrating units into a single module, such as board layout and design costs), and cardinality cost overhead (e.g., the overhead costs associated with each module 114 in the system 100), may be considered along with the constraint-based metrics. These metrics may be obtained via empirical studies. All of the metrics are then combined to generate an overall metric to be used to evaluate sample configurations. Changing any individual metric changes the total overall metric, providing flexibility in selecting and modifying constraint priorities.

Note that each individual metric may have an effect on the other metrics. As noted above, for example, decreasing the reliability may also decrease the cost. Also, increasing integration into modules may decrease reliability because modularization increases overall system downtimes during module replacements. This interdependency among metrics, which normally makes manual optimization complicated, may be programmed into the optimization tool.

Next, the tool generates a representative statistical sample of the elements 106 based on the data about each element 106 as well as possible redundant configurations and integration configurations for the element 106 (blocks 206 through 210). As may be known in the art, representative statistical sampling provides a random sampling of the possible combinations of elements 106 (e.g., the combinatorial space) and does not actually calculate every possible combination of the elements 106 because doing so would require too much storage space and too many processing resources. Instead, it generates enough sample combinations to provide a general indication of the layout of the combinatorial space.

Note that generating a greater number of samples may provide a more accurate depiction of the combinatorial space, but may also require more resources to calculate. Reducing the number of samples will reduce the resources needed to determine the combinatorial space, but it may also reduce the resolution of the combinatorial space. Those of ordinary skill in the art will be able to determine the number of samples needed to obtain an accurate enough picture of the combinatorial space for optimization purposes. The statistical sampling can be conducted via any known method, such as Monte Carlo, Simulated Annealing, Buckling Algorithm, Genetic Algorithm, as well other sampling methods known to those skilled in the art. Regardless of the specific method used to generate the samples, the overall process and concept will be similar for the different methods.

For a given total number of units NE, there can be a maximum of NE elements, and therefore NE modules (where there may be no integration at all). Further, as discussed above with respect to FIG. 1, it may be possible for some elements 106 to be integrated together into one module 114. However, some elements may not be able to be integrated with other elements; thus, the number of elements that cannot be integrated may be referenced by the term NN; thus, the minimum number of modules may be NN +1. From these values, the maximum integration of all integrable elements NI can be expressed as NI=NE−NN; in other words, there can be at most NI modules over all the integrable elements. For example, if the system 100 will be using 10 different elements 106 and there are no restrictions on integration, then, the maximum number of modules 114 that can be formed from the elements 106 will be 10 (when there may be no integration at all) and the minimum number of modules will be 1 (when all 10 elements are integrated into a single module). Further, for any selected number of elements 106, there are many different ways in which the various units, both primary 102 and redundant 104, can be combined to form the selected number of elements 106.

Referring back to FIG. 2, to generate a statistical sample over the set of NI elements, the tool generates one sample configuration by randomly choosing a number of modules NM between 1 and NI (block 206). The content of each module 114 may be constructed by associating one random element with each module so that none of the modules in the sample are empty (block 208). The remaining NI-NM elements are then distributed randomly over the NM modules (block 210). Redundant units 104 may also be allotted to one or more of the elements if conditions permit, again by choosing a random integer within the allowed maximum number of redundant units for that element.

Once the random sample configuration has been selected, the tool computes the cost for each module (block 212) based on the number of elements 106 in the module 114, the number of primary units 102 and redundant units 104 within each element 106 and any changes in cost (e.g., modularization benefit, compression cost overhead, etc.) of the module due to the integration of elements 106 in a single module 114. The tool also computes the reliability (e.g., downtime) of each module 114 based on the failure rate of each element 106 in each module 114 (block 212). Note that the failure rate of each element can be influenced by the number and type of redundant units 104 within the element, which in turn can affect the downtime of the module. As noted above, integrating two or more elements within a module may decrease the module's reliability because failure of one element requires replacement of all of the elements in the same module as the failed element.

After the costs and downtime of each module have been calculated, the total cost of the system may be calculated by adding together the costs of all the modules as well as any associated cardinality costs (block 213). Similarly, the reliability of the system 100 may be computed by adding together the individual reliabilities (e.g., the downtimes) of each module (block 214).

In one embodiment, optimization metrics (generally referred to as V in FIG. 2) calculated during this process (block 220) are as follows:

$$V1 = (\text{total cost})/(\text{cost constraint})$$

$$DT = \text{total downtime} - \text{target downtime}$$

$$V2 = (\text{sign}(DT))*DT^k$$

$$V3 = V1 + a*V2$$

where a is a scaling factor based on the overall metric and k is a user-selected number representing the criticality of excess downtime over the target downtime in the device being optimized; for example, devices where excess downtime is highly undesirable may have a higher k value than devices where excess downtime is less of a problem. In this example, V1 is a cost optimization metric, V2 is a reliability optimization metric, and V3 a total optimization metric used to optimize both cost and reliability. Of course, other metrics optimizing other constraints may be incorporated as well. As noted above, the overall metric allows a user to weight the relative importance of various constraints, such as cost versus reliability. The scaling factor a incorporates the relative weighting between the cost optimization metric V1 and the reliability optimization metric V2 in calculating the total optimization metric V3.

As shown in FIG. 2, the sample configuration evaluated in a previous cycle and its associated total optimization metric V may be stored in memory (block 222). The tool may then generate another random sample configuration as explained above and calculates the optimization metric V', (e.g., the total optimization metric V3'), for the new configuration (block 220).

The current optimization metric V' may be then compared with the stored optimization metric V (block 223). In one embodiment, the total optimization metric V3' for the current sample configuration is then compared with the total optimization metric V3 stored in memory. If the current total optimization metric V3' is greater than the stored total optimization metric V3, it may ignore the current metric V3 and generate another sample configuration for evaluation (block 206)—e.g., because the current sample configuration has a higher cost and/or a higher downtime than previously evaluated configurations.

If the current total optimization metric V3' is lower than the stored optimization metric V3, however, this means that the current sample configuration meets the desired constraints better than any previously considered sample configuration. If this occurs, the current total optimization metric V3' along with its associated configuration replaces any previously stored optimization metrics and configurations (block 224) and may be stored in memory (block 222) before obtaining another sample configuration.

Note that the comparing and storing steps can be conducted with respect to the cost and reliability optimization metrics V1 and V2 and therefore current metrics V1' and V2') individually as well without departing from the scope of the invention. Also, in one embodiment, the tool stores the minimum values of all of the optimization metrics and their associated sample configurations. This allows optimization and evaluation of designs focusing on an individual constraint (e.g., cost or reliability) at the same time as the optimization of designs incorporating multiple constraints. Note that the optimal configuration based solely on cost or reliability may be different than the optimal configuration based on multiple constraints. For example, a configuration having a minimum reliability optimization metric V2 may contain no integration, and therefore no module with more than one element, due to the increase in overall system downtime caused by module replacement.

The tool may then repeat the sampling and optimization metric calculation process until any or all of the optimization metrics V converge or if a maximum allowable number of iterations is reached (block 226). At each iteration, the tool has stored d the minimum value of each optimization metric calculated so far along with its associated configuration, as noted above. Because the sampling is completely random, convergence and/or a relatively large number of samples will ensure that the configurations with the lowest optimization metrics are indeed optimum configurations for the system.

Once the iterative process is complete, the optimized configurations are output for consideration by the designer (block 228).

If the designer wishes to change the metrics used for optimization, the designer can simply change the relative weightings of the constraints (e.g., cost and reliability). This may in turn change the scaling factor a in the total optimization metric V3 so that the cost optimization metric V1 and the reliability optimization metric V2 are weighted relative to each other based on the weightings selected by the designer. The statistical sample of the same combinatorial space can then be evaluated using the new total optimization metric V3 in the manner shown in FIG. 2.

Because the statistical sampling of the combinatorial space and the iterative process are both conducted via an algorithm rather than relying on a team of human experts, the inventive process optimizes the configuration, and therefore the redundancy allocation, of a given system in a matter of minutes rather than months. Further, using a statistical sampling process ensures that the optimization tool evaluates enough samples to be a fair representation of the combinatorial space, thereby ensuring that the configuration may be truly optimized for the given system.

Note that although the above description focuses on optimizing a system based on the characteristics of the elements, the same process can be used independently to optimize the configuration of a single module or element within the system. In other words, the invention can be used to optimize any subset of a given system as well as the entire system itself.

The invention is therefore able to optimize system configuration and device redundancy based on the priorities assigned to various manufacturing constraints, such as cost and reliability. By automating the optimization process in software, the invention can reliably and quickly determine optimum parts allocation regardless of the relative priorities given to the manufacturing parameters. Further, the invention allows recalculation of the optimum allocation quickly based on different parameter weightings, allowing designers to experiment with different parameter weightings by simply changing the inputs for the tool.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, this method, system and portions thereof and of the described method and system may be implemented in different locations, such as network elements, stations, controllers, and/or switching centers, for example. Moreover, this methodology can be applied to any flexible manufacture process optimization. Further, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

We claim:

1. A method of determining an optimum configuration for a system having a plurality of devices, comprising:
    sampling a combinatorial space formed by the plurality of devices to obtain a sample configuration;
    generating a total optimization metric based on a total cost and a total reliability of the plurality of devices in the sample configuration, wherein the total optimization metric is calculated based on a relative weighting of a cost constraint and a reliability constraint;
    comparing the optimization metric with a stored optimization metric corresponding to a previous sample configuration;
    erasing the stored optimization metric and storing the optimization metric and the sample configuration if the optimization metric is less than the stored optimization metric;
    repeating the sampling, generating and comparing steps until at least one of an optimization metric convergence and a maximum number of iterations occurs; and
    selecting one of the sample configuration or the previous sample configuration as the optimum configuration based on the comparing step.

2. The method of claim 1, wherein the plurality of devices are a plurality of elements each comprising at least one unit selected from a group consisting of a primary unit and a redundant unit.

3. The method of claim 1, wherein the sample configuration incorporates at least one module integrating at least two elements, and wherein the sampling step comprises:
    choosing a number of modules in the sample configuration;
    identifying elements that cannot be integrated into one module;
    assigning at least one element into each module; and
    distributing any remainder of said plurality of elements among the modules to complete the sample configuration.

4. The method of claim 1, wherein the total optimization metric calculated by the generation step includes:
    a cost optimization metric based on a total cost of the plurality of devices and at least one of a modularization benefit, a compression cost overhead reflecting an overhead cost in integrating at least two elements into a module, and a cardinality cost reflecting an overhead cost associated with an individual module; and
    a reliability optimization metric based on a total downtime of the plurality of devices and adjustments to the total downtime based on modularization.

5. A method of determining an optimum configuration for a system having a plurality of devices, comprising:
    sampling a combinatorial space formed by the plurality of devices to obtain a sample configuration that incorporates at least one module integrating at least two elements, by
        choosing a number of modules in the sample configuration;
        assigning at least one element into each module; and
        distributing any remainder of said plurality of elements among the modules to complete the sample configuration;
    generating an optimization metric based on at least one operating characteristic of said plurality of devices in the sample configuration;
    comparing the optimization metric with a stored optimization metric corresponding to a previous sample configuration; and
    selecting one of the sample configuration or the previous sample configuration as the optimum configuration based on the comparing step.

6. A method of determining an optimum configuration for a system having a plurality of devices, comprising:
    sampling a combinatorial space formed by the plurality of devices to obtain a sample configuration;
    generating an optimization metric based on at least one operating characteristic of said plurality of devices in the sample configuration;
    comparing the optimization metric with a stored optimization metric corresponding to a previous sample configuration; and
    selecting one of the sample configuration or the previous sample configuration as the optimum configuration based on the comparing step;
    wherein the optimization metric of the generating step comprises a cost optimization metric based on a total cost of the plurality of devices and incorporates at least one of a modularization benefit, a compression cost overhead reflecting an overhead cost in integrating at least two elements into a module, and a cardinality cost reflecting an overhead cost associated with an individual module.

7. A method of determining an optimum configuration for a system having a plurality of devices, comprising:
    sampling a combinatorial space formed by the plurality of devices to obtain a sample configuration;
    generating an optimization metric based on at least one operating characteristic of said plurality of devices in the sample configuration;
    comparing the optimization metric with a stored optimization metric corresponding to a previous sample configuration; and selecting one of the sample configuration or the previous-sample configuration as the optimum configuration based on the comparing step;

wherein the optimization metric of the generating step comprises a reliability optimization metric based on a total reliability of the plurality of devices that is calculated based on a total downtime of the plurality of devices.

8. A method of determining an optimum configuration for a system having a plurality of devices, comprising:

sampling a combinatorial space formed by the plurality of devices to obtain a sample configuration;

obtaining a relative weighting of a cost constraint and a reliability constraint;

generating an optimization metric comprising a total optimization metric based on at least a total cost and a total reliability of said plurality of devices in the sample configuration, and based on the relative weighting;

comparing the optimization metric with a stored optimization metric corresponding to a previous sample configuration; and selecting one of the sample configuration or the previous sample configuration as the optimum configuration based on the comparing step.

* * * * *